United States Patent
Maus et al.

(10) Patent No.: US 8,465,566 B2
(45) Date of Patent: Jun. 18, 2013

(54) HONEYCOMB BODY, METHOD FOR PRODUCING A BRAZED HONEYCOMB BODY AND EXHAUST GAS TREATMENT COMPONENT

(75) Inventors: Wolfgang Maus, Bergisch Gladbach (DE); Rolf Brück, Bergisch Gladbach (DE); Peter Hirth, Rösrath (DE)

(73) Assignee: EMITEC Gesellschaft fuer Emissionstechnologie mbH, Lohmar (DE)

( * ) Notice: Subject to any disclaimer, the term of this patent is extended or adjusted under 35 U.S.C. 154(b) by 0 days.

(21) Appl. No.: 12/892,126

(22) Filed: Sep. 28, 2010

(65) Prior Publication Data

US 2011/0067371 A1    Mar. 24, 2011

Related U.S. Application Data

(63) Continuation of application No. PCT/EP2009/052330, filed on Feb. 27, 2009.

(30) Foreign Application Priority Data

Mar. 28, 2008   (DE) .......................... 10 2008 016 148

(51) Int. Cl.
*B01D 39/14* (2006.01)
*B01D 39/06* (2006.01)
*B01D 24/00* (2006.01)
*B01D 50/00* (2006.01)
*F01N 3/00* (2006.01)

(52) U.S. Cl.
USPC ................ 55/523; 55/522; 55/524; 422/169; 422/170; 422/171; 422/172; 422/177; 422/178; 422/179; 422/180; 422/181; 422/182; 60/297

(58) Field of Classification Search
USPC  55/522–524; 422/169–172, 177–182; 60/297
See application file for complete search history.

(56) References Cited

U.S. PATENT DOCUMENTS

| 5,050,790 A | * | 9/1991 | Takikawa et al. ............. 228/181 |
| 5,436,216 A | * | 7/1995 | Toyao et al. ................... 502/439 |
| 5,891,248 A | | 4/1999 | Koshiba et al. |

(Continued)

FOREIGN PATENT DOCUMENTS

| DE | 10 2004 058 285 A1 | 6/2006 |
| JP | 2000093806 A | 4/2000 |

(Continued)

OTHER PUBLICATIONS

International Search Report of PCT/EP2009/052330, Dated Jun. 10, 2009.

*Primary Examiner* — Amber Orlando
(74) *Attorney, Agent, or Firm* — Laurence A. Greenberg; Werner H. Stemer; Ralph E. Locher

(57) ABSTRACT

A honeycomb body includes at least one housing and metal foils forming a channel structure. The channel structure is fastened to the housing by a multiplicity of linear brazed connections. A production method for providing the linear brazed connections between the channel structure and the housing and an exhaust gas treatment component having the honeycomb body in an exhaust system of a motor vehicle, are also provided.

10 Claims, 4 Drawing Sheets

U.S. PATENT DOCUMENTS

| | | |
|---|---|---|
| 6,296,922 B1 | 10/2001 | Nagel |
| 7,073,700 B2 * | 7/2006 | Caspar et al. ............ 228/110.1 |
| 7,108,168 B2 | 9/2006 | Brück et al. |
| 7,347,042 B2 * | 3/2008 | Bruck et al. .................... 60/297 |
| 7,666,520 B2 * | 2/2010 | Wieres et al. ................ 428/593 |
| 7,871,576 B2 * | 1/2011 | Bruck et al. ................. 422/180 |
| 2001/0013390 A1 * | 8/2001 | Staubwasser ................ 156/205 |
| 2004/0217149 A1 * | 11/2004 | Bruck et al. ................. 228/181 |
| 2005/0096218 A1 * | 5/2005 | Kurth et al. .................. 502/439 |
| 2005/0106084 A1 * | 5/2005 | Maus et al. .................. 422/180 |
| 2005/0170957 A1 * | 8/2005 | Maus et al. .................. 502/439 |
| 2006/0233680 A1 * | 10/2006 | Muller .......................... 422/177 |
| 2007/0259198 A1 | 11/2007 | Althofer et al. |
| 2008/0203140 A1 | 8/2008 | Wieres |

FOREIGN PATENT DOCUMENTS

| | | |
|---|---|---|
| RU | 2291767 C2 | 1/2007 |
| WO | 98/53187 A1 | 11/1998 |
| WO | 03055631 A1 | 7/2003 |
| WO | 2007/031331 A1 | 3/2007 |

* cited by examiner

HONEYCOMB BODY, METHOD FOR PRODUCING A BRAZED HONEYCOMB BODY AND EXHAUST GAS TREATMENT COMPONENT

CROSS-REFERENCE TO RELATED APPLICATION

This is a continuation, under 35 U.S.C. §120, of copending International Application No. PCT/EP2009/052330, filed Feb. 27, 2009, which designated the United States; this application also claims the priority, under 35 U.S.C. §119, of German Patent Application DE 10 2008 016 148.9, filed Mar. 28, 2008; the prior applications are herewith incorporated by reference in their entirety.

BACKGROUND OF THE INVENTION

Field of the Invention

The present invention relates to a honeycomb body having at least one housing and metal foils which form a channel structure. Such a honeycomb body is used, in particular, as an exhaust gas purification unit in exhaust systems of mobile internal combustion engines. The invention also relates to a method for producing a brazed honeycomb body and to an exhaust gas treatment component.

Such honeycomb bodies are usually composed of a one-piece and/or multi-part housing which is provided with a relatively large material thickness, so that it can constitute an external form or shape and/or even part of an exhaust line itself. In contrast thereto, efforts are made to make the metal foils for the construction of the channel structure relatively thin-walled in order to implement a surface which is as large as possible in the same installation space. The surface is used, for example, to apply catalysts which come into contact with the exhaust gas that flows through the channel structure. That ensures intensive contact between the exhaust gas components and the catalyst, and therefore effective purification of the exhaust gas.

It is problematic in that case that the thin metal foils behave differently with respect to the relatively thick-walled housing when thermal and/or dynamic alternating stress is applied, such as is customary in a mobile exhaust system. For that reason, the connection between the housing and the metal foils constitutes a particular technical challenge.

It is known to apply strips made of brazed material or so-called brazing foil onto an inner lateral surface in the housing of such a honeycomb body before the integration of the metal foils or of the channel structure, and then to insert the channel structure. It is also known to wind such a brazing foil around the channel structure and then to introduce that assembly into the housing so that the entire brazing foil bears on the inner lateral surface of the housing. The same method has already been proposed, wherein the brazing region is not provided as a band over the entire circumference but rather through the use of relatively large patches. A corresponding honeycomb body is illustrated only by way of example in a diagrammatic form in FIG. 3.

That connection technique or application of brazing material leads to a situation in which a large amount of brazing material is left unused on the inner lateral surface of the housing and therefore not only an increased material demand and therefore higher manufacturing costs but also concentrations of brazing material on the surface of the housing or of the metal foils occur which can result in undesired diffusion methods with alloy elements of the housing and/or of the metal foil. Furthermore, it is necessary to bear in mind the fact that that only achieves limited adaptation of the brazing regions with respect to the thermal and/or dynamic expansion behavior of the housing and/or metal foils.

SUMMARY OF THE INVENTION

It is accordingly an object of the invention to provide a honeycomb body, a method for producing a brazed honeycomb body and an exhaust gas treatment component, which overcome the hereinafore-mentioned disadvantages and at least partially resolve the problems of the heretofore-known devices and methods of this general type. In particular, a honeycomb body is to be disclosed which exhibits improved durability in relation to thermal and/or dynamic alternating stresses of such a honeycomb body in the exhaust system of mobile internal combustion engines. The aim is also to disclose a production method which results in more economical consumption of brazing material.

With the foregoing and other objects in view there is provided, in accordance with the invention, a honeycomb body, comprising at least one housing, metal foils forming a channel structure, and a multiplicity of linear brazed connections attaching the channel structure to the housing.

The housing is preferably provided in one part and can have a cylindrical cross-sectional shape or a cross-sectional shape which deviates therefrom. The metal foils preferably include at least partially structured metal foils which are in the end wound, layered and/or twisted in such a way that they form a channel structure, for example in the manner of a honeycomb structure, with a multiplicity of channels which run substantially parallel to one another. While the housing generally has a material thickness greater than 1 mm, the metal foils are embodied with a material thickness which is, for example, in a range of less than 0.12 mm, for example even less than 0.08 mm.

It is proposed to provide a multiplicity of linear brazed connections instead of resorting to the known large brazing regions. A multiplicity in this case means, in particular, at least 10 brazed connections, for example even more than 30 or even at least 100 brazed connections. The linear structure of the brazed connections is preferably oriented in this case in such a way that the structure is aligned transversely with respect to the direction of a circumference of the housing. In particular, the linear connections run parallel to the direction of extent of the metal foils in the housing. A brazed connection is "linear" in particular if it is significantly longer than it is wide, in which case the width is to be determined in the direction of the circumference of the housing. It is particularly preferable for "linear" to be narrower than, for example, the largest width of a channel of the channel structure. It is therefore clear that with the multiplicity of these small linear brazed connections, a more selective connection of the metal foil or of the channel structure to the housing is made possible, for example with respect to the position of highly stressed regions of the channel structure in which, if appropriate, more linear brazed connections can be provided than in other partial regions, or if it requires a relatively large degree of flexibility, a smaller number of linear brazed connections can be provided at these locations. At any rate, this linear shape of the many brazed connections permits a flexible embodiment of the brazing pattern between the housing and the channel structure.

In accordance with another feature of the invention, each linear brazed connection is embodied with a width of at most 5 mm in the direction of a circumference of the housing. It is preferred that the width does not exceed a value of 3 mm or of even 1 mm. Such a sparing application of brazing material makes production cost-effective and prevents undesired brazed connections in adjacent regions.

In accordance with a further feature of the invention, it is advantageous for a multiplicity of metal foils to be disposed in such a way that they bear with at least one edge against the housing and each form at least one linear brazed connection. In other words, this means, for example, that the metal foils are brought to bear with their two edges against the inner lateral surface of the housing, for example by winding, twisting and/or layering the metal foil accordingly. The edges then bear against this inner lateral surface of the housing or tangentially fit tightly against the housing. As a result of the shape and/or the configuration of the metal foils, the contact region with the housing and/or the prestress or preload with which the edges push against the housing can therefore be set. It is proposed to use precisely these contact regions or the region of the edges of the metal foils which fit tightly against them, for such a linear brazed connection. Consequently, the linear brazed connection is limited, for example, by precisely the edge of the metal foil, and extends from there into inner regions of the respective metal foil.

In accordance with an added feature of the invention, the housing has brazing material in contact regions with the metal foils. This means, in other words, in particular that no residual brazing material which is, for example, spread over the circumference of the housing as the result of the provision of conventional brazing strips, is present between them. Consequently, in this region also only the actual contact region is provided with brazing material, with the result that the use of the brazing material can be reduced further.

In accordance with an additional feature of the invention, no uninterrupted circumferential brazing region is provided in the direction of a circumference of the housing. This is also intended to substantially mean that no circumferential brazing region is to be found on the inner circumference of the housing after fabrication of the brazed honeycomb body. For the situation described in this case, this applies to the entire honeycomb body, that is to say the entire inner lateral surface of the housing which is covered by the channel structure.

In accordance with yet another feature of the invention, it is advantageous if a circumferential brazing region with a multiplicity of linear brazed connections which are spaced apart from one another and perpendicular to the direction of a circumference is provided in the direction of a circumference of the housing. Such a brazing region has, for example in the direction of the circumference, at least 20 linear brazed connections which are therefore aligned with one another particularly in the direction of the circumference, in particular run parallel to one another. If appropriate, a plurality of such circumferential brazing regions may be provided, in particular one near an end side of the channel structure. However, in such a circumferential brazing region the proportion of the surface area which is made up by the linear brazed connections on the inner lateral surface in this circumferential brazing region is generally at most 50%, in particular at most 20% and preferably even at most 10%.

In accordance with yet a further feature of the invention, the honeycomb body has at most 10% of the surface area of an inner lateral surface of the housing which is covered by the channel structure embodied with linear brazed connections. The proportion is quite preferably even at most 5% or even at most 2%. In other words, the inner lateral surface or inner lateral area of the housing is the surface which is covered by the channel structure, wherein the latter is generally axially bounded by the end sides of the channel structure, and defines the intermediate circumferential region. Consequently, with the linear shape of the brazed connection which is proposed herein, only a very small portion of the surface area actually leads to the formation of a connection through the use of technical joining, such as brazing, welding or sintering, between the channel structure or metal foils and the housing.

With the objects of the invention in view, there is also provided a method for producing a honeycomb body having at least one housing and metal foils forming a channel structure. The method comprises at least the following steps:
(a) providing a plurality of metal foils;
(b) positioning a multiplicity of adhesive strips on at least some of the metal foils;
(c) introducing the metal foils into the housing so that a channel structure is formed and at least some of the adhesive strips are in contact with the housing;
(d) brazing the honeycomb body so that brazing material is disposed on the adhesive strips on the housing; and
(e) heating the honeycomb body in order to form a multiplicity of linear brazed connections between the metal foils and the housing.

The method serves, in particular, to produce a honeycomb body as described according to the invention.

Step (a) relates, in particular, to the provision of at least partially structured metal foils and quite particularly preferably the provision of a plurality of smooth metal foils and a plurality of corrugated metal foils.

Step (b) relates to the application of adhesive to specifically predefined regions of the metal foils. It is quite particularly preferred in this case, above all for the connection between the metal foils and the housing, that these adhesive strips are positioned in the boundary region of the edges or of the later contact regions toward the housing. Preferably, a printing technique is applied for the application of the adhesive, in particular using a printing device (for example in the manner of an inkjet method). With such a printing device it is possible to produce the adhesive strips particularly precisely and with an adjusted size, with the adhesive strips corresponding, for example, substantially also to the ultimate linear form of the brazed connection.

In step (c), the metal foils are then introduced into the housing (at least partially). The metal foils can, for this purpose, be previously layered, stacked and/or twisted and/or wound. The introduction into the housing can be carried out in such a way that the metal foils are pressed into a (for example single-part) housing (partially, if appropriate). However, it is also possible to insert the metal foils into a (divided or open) housing and to then close the housing. At any rate, channel structures having channels which run substantially parallel to the direction of extent of the housing are preferably formed in this case. The introduction of the metal foils is carried out simultaneously in such a way that at least some of the adhesive strips, specifically those which do not serve to connect the metal foils to one another, come to bear against the housing or adjoin directly there.

Step (d) relates, in particular, to the method step in which brazing material is placed in contact with the adhesive strips from an end side of the honeycomb body through the channel structure. The brazing material, in particular powdered brazing material, then sticks to the adhesive strip and the desired amount thereof is secured there practically for the following step.

Step (e) then constitutes a thermal joining method. It is preferred in this case that the honeycomb body be high-temperature brazed, that is to say soldered, for example, at a temperature above 800° C. and, if appropriate, under a defined atmosphere (vacuum or protective gas). This leads to a situation in which the adhesive (bonding agent) substantially vaporizes and the brazing material is liquefied. After the heating, the brazing material is ultimately cooled, with the result that a material-locking connection of metal foils, brazing material and housing is produced.

In accordance with another mode of the invention, the housing is provided free of adhesive and brazing material. This applies, in particular, up to step (e) with the exception of the adhesive or brazing material, which is transferred to the housing by step (c) or (d) from the metal foils. In this context it is also quite particularly preferred that the housing be provided on the inner lateral surface with, for example, passivation measures which prevent undesired accumulation of adhesive and/or brazing material in regions other than those determined by the metal foils.

With the objects of the invention in view, there is concomitantly provided an exhaust gas treatment component in an exhaust system of a motor vehicle. The exhaust gas treatment component comprises a honeycomb body according to the invention.

Other features which are considered as characteristic for the invention are set forth in the appended claims, noting that the features which are disclosed in the claims can be combined with one another in any desired technologically appropriately fashion and indicate further features of the invention.

Although the invention is illustrated and described herein as embodied in a honeycomb body, a method for producing a brazed honeycomb body and an exhaust gas treatment component, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings which explain the invention further and disclose additional embodiment variants.

DETAILED DESCRIPTION OF THE INVENTION

Figure 1:
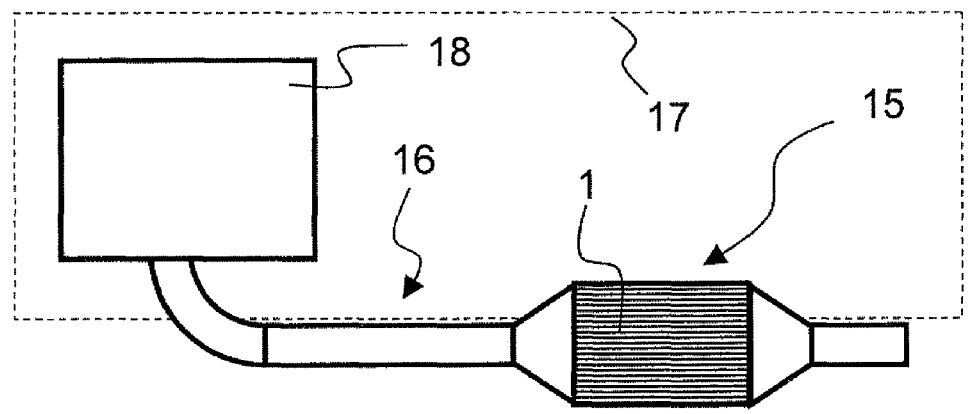
FIG. 1 is a diagrammatic, plan view showing a basic structure of an exhaust system in a motor vehicle.

Referring now in detail to the figures of the drawings, which show particularly preferred embodiment variants to which the invention is not restricted, and first, particularly, to FIG. 1 thereof, there is seen a diagrammatic view of a motor vehicle 17, for example a passenger car or a truck. This motor vehicle 17 has an engine 18, for example a diesel engine or a spark ignition engine. Exhaust gas that is produced in the engine 18 flows through an exhaust system 16, which is normally embodied with an exhaust line and a plurality of exhaust gas treatment components 15. The exhaust gas treatment components which are used are, in particular, catalyst carrier bodies, filters, separators, adsorbers, plasma reactors, reformers, etc. It is shown herein diagrammatically that the exhaust gas treatment component 15 has a honeycomb body 1.

Figure 2:
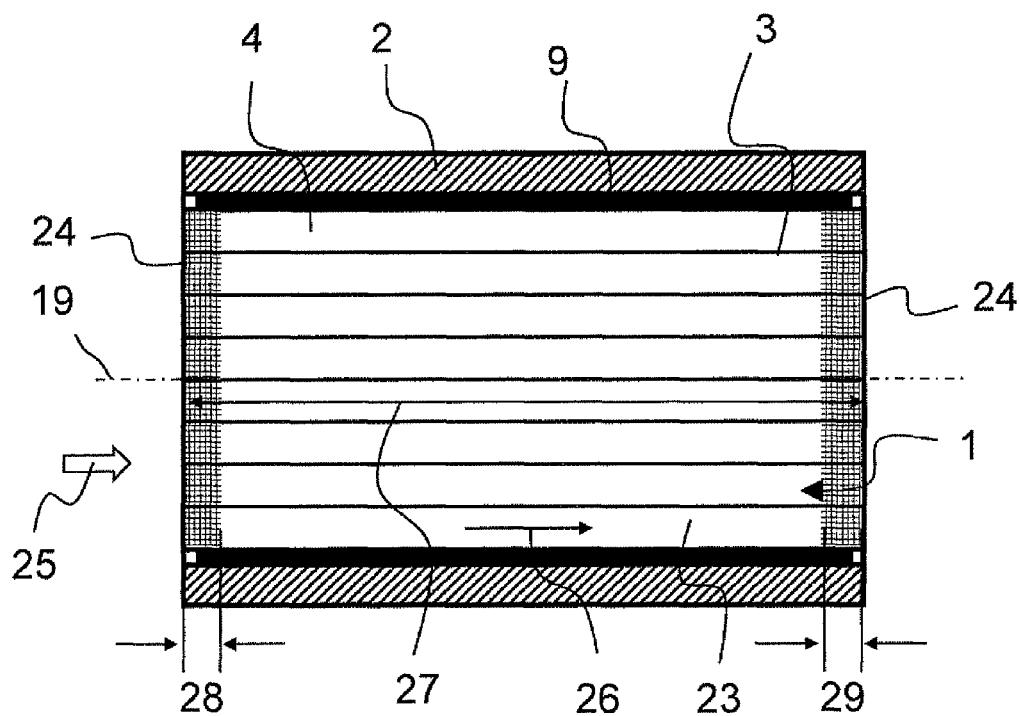
FIG. 2 is a longitudinal-sectional view of a honeycomb body.

FIG. 2 shows an embodiment of a honeycomb body 1 in a longitudinal section. A one-piece, cylindrically configured housing 2, which has relatively thick walls, is illustrated herein at the exterior. The housing 2 forms a contact region 9, in the interior of the housing 2, with a channel structure 4 disposed therein. This channel structure 4 is formed with a plurality of smooth and structured metal foils 3. Channels 23 which are formed in this case have a channel extension direction 26 that is substantially parallel to an axis 19 of the honeycomb body. It is possible for some of the walls of the channel structure 4 to also be formed with other materials, for example filter materials. It is also possible for the metal foils 3 to be embodied with through holes, in such a way that exhaust gas flows arriving in a direction of flow 25 are divided up at a first end side 24 and mixed with one another in the interior of the channel structure 4.

It is also represented in this case that the respective channel structure 4 and the shaped or formed metal foils 3 are not connected to one another over an entire extent 27 in the direction of the axis 19. Instead, a front section 28 and a rear section 29, in which brazed connections are produced, are formed near the end sides 24.

Figure 3:
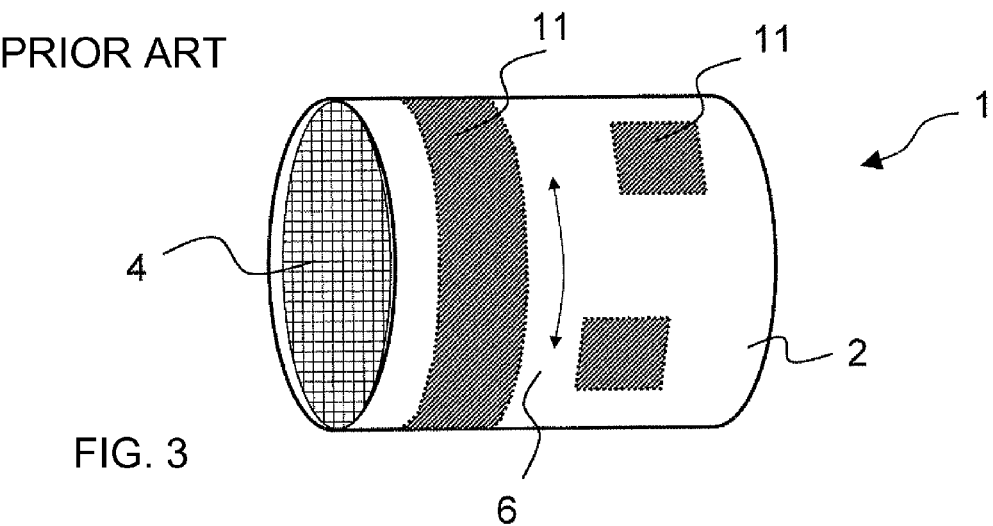
FIG. 3 is a perspective view showing brazing regions between a housing and a metal foil according to the prior art.

FIG. 3 is a diagrammatic view illustrating how a connection has been fabricated between the channel structure 4 and the housing 2 according to the prior art. For this purpose, relatively large-area brazing regions 11 are provided in the direction of the circumference 6. The brazing regions 11 may be formed in a circumferential and/or patch-like manner in this case. At any rate, they have a significant extent in the direction of the circumference 6.

Figure 4:
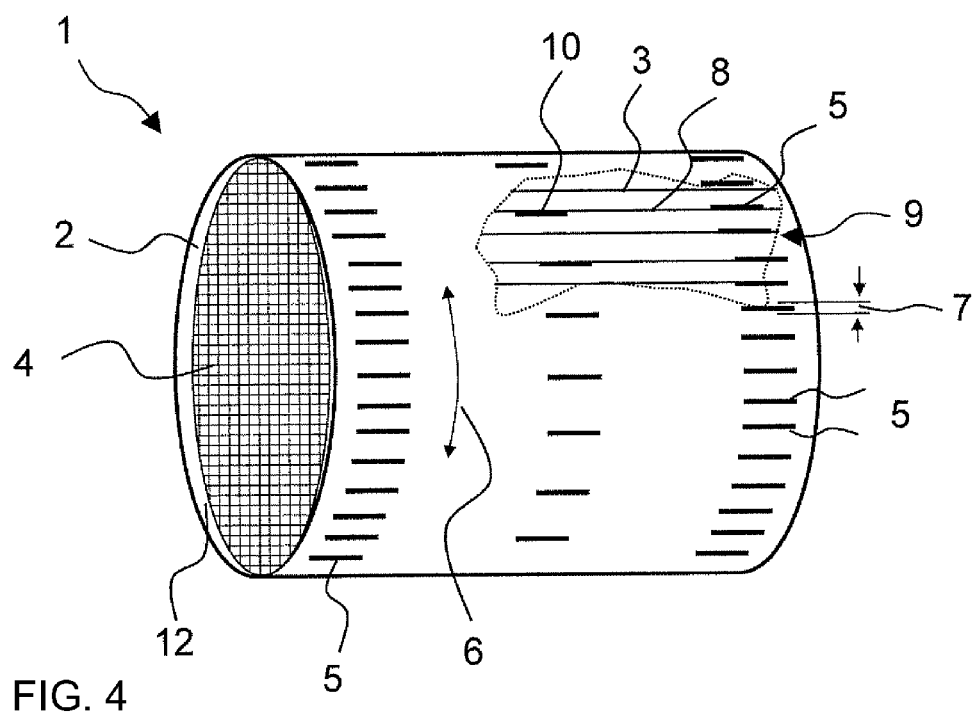
FIG. 4 is a partly broken-away, perspective view showing an embodiment variant of the honeycomb body according to the invention.

In contrast to FIG. 3, FIG. 4 illustrates an embodiment variant of the honeycomb body 1 according to the invention. The channel structure 4 is formed in this case with a multiplicity of smooth and corrugated metal foils 3, as is apparent from a broken-away portion at the upper right. These metal foils 3 have edges 8 which bear against an inner lateral surface 12 of the housing 2. Linear brazed connections 5 are then implemented precisely in the contact region 9 at desired positions by correspondingly providing brazing material 10. It is apparent in this case that no uninterrupted brazing region is formed in the direction of the circumference 6, but rather an accumulation of linear brazed connections 5, which are specifically spaced apart from one another, is formed. A width 7 of the linear connections 5 is preferably less than 2 mm in this case.

Figure 5:
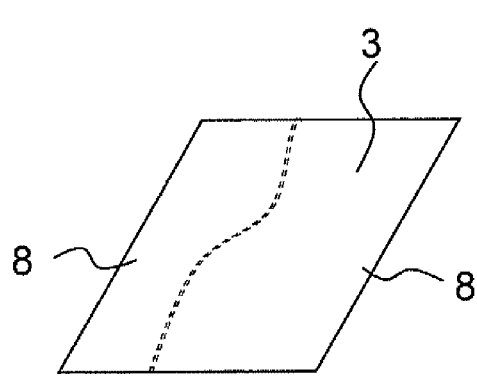
FIGS. 5-10 are perspective views showing preferred embodiment variants of a method according to the invention.
Figure 6:
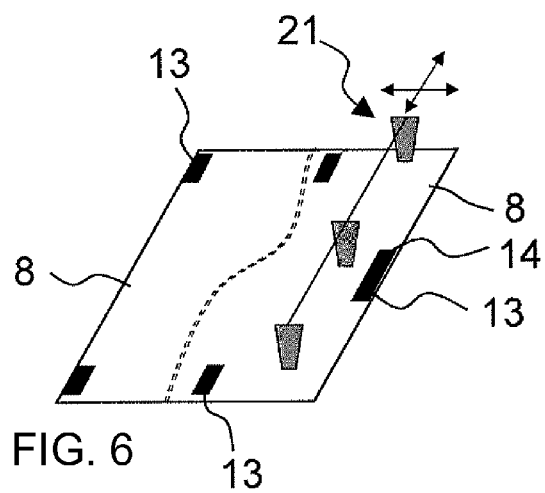
Figure 7:
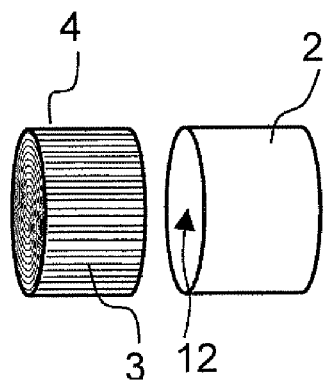

FIGS. 5 to 10 illustrate a preferred production method for such honeycomb bodies 1. FIG. 5 illustrates a smooth metal foil 3 with oppositely-lying edges 8. FIG. 6 illustrates an application of adhesive 14 (for example bonding agent). In this context, a printer device 21 is moved over the metal foil 3 so that adhesive strips 13 are formed at specific locations, for example near the edges 8 as well. It is to be borne in mind in each case that the positions of the adhesive strips 13 at the edges 8 need not be symmetrical but rather random patterns can be generated in this case.

A plurality of such smooth metal foils 3 and additional corrugated metal foils 3 (not shown in detail herein) can then be stacked and wound with one another so that a channel structure 4 is formed. This channel structure 4 can then be introduced into a one-piece housing 2, which is illustrated as a cylinder in FIG. 7. In this context, the edges 8 of the metal foils 3 come to bear against the inner lateral surface 12 of the housing 2.

Figure 8:
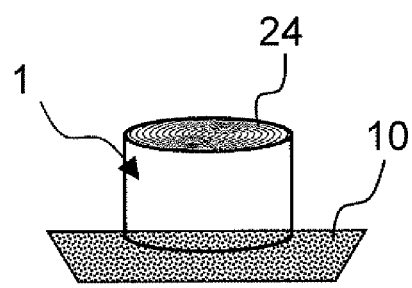
Figure 9:
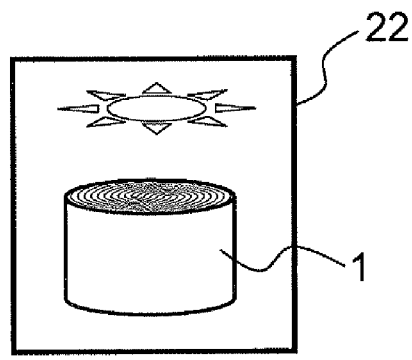
Figure 10:
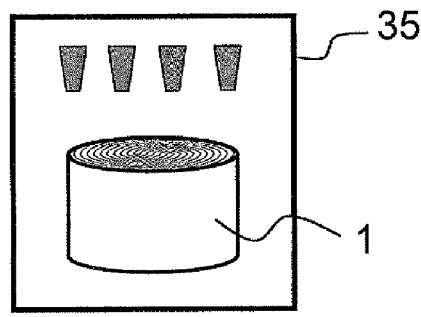

FIG. 8 illustrates that the honeycomb body 1, which is prepared in this way, is submerged with its end side 24 into brazing material 10, for example. The brazing material which, for instance, is powdered, can then be transported into inner regions of the channel structure 4 and, in particular, to the adhesive strips 13 through the use of specific jolting, shaking or vibrating mechanisms and/or a carrier substance (air). The brazing material 10 is then deposited on the desired adhesive strips 13.

The honeycomb body which is prepared in this way is transferred, for example, to a furnace 22 and subjected there to thermal treatment. The linear brazed connections are formed in the process (see FIG. 9).

If appropriate, a coating method (indicated in FIG. 10) can also follow, during which the brazed honeycomb body 1 is then fed to a coating device 35. The honeycomb body 1 can be coated, in particular, with a so-called washcoat and/or a catalyst.

Figure 11:
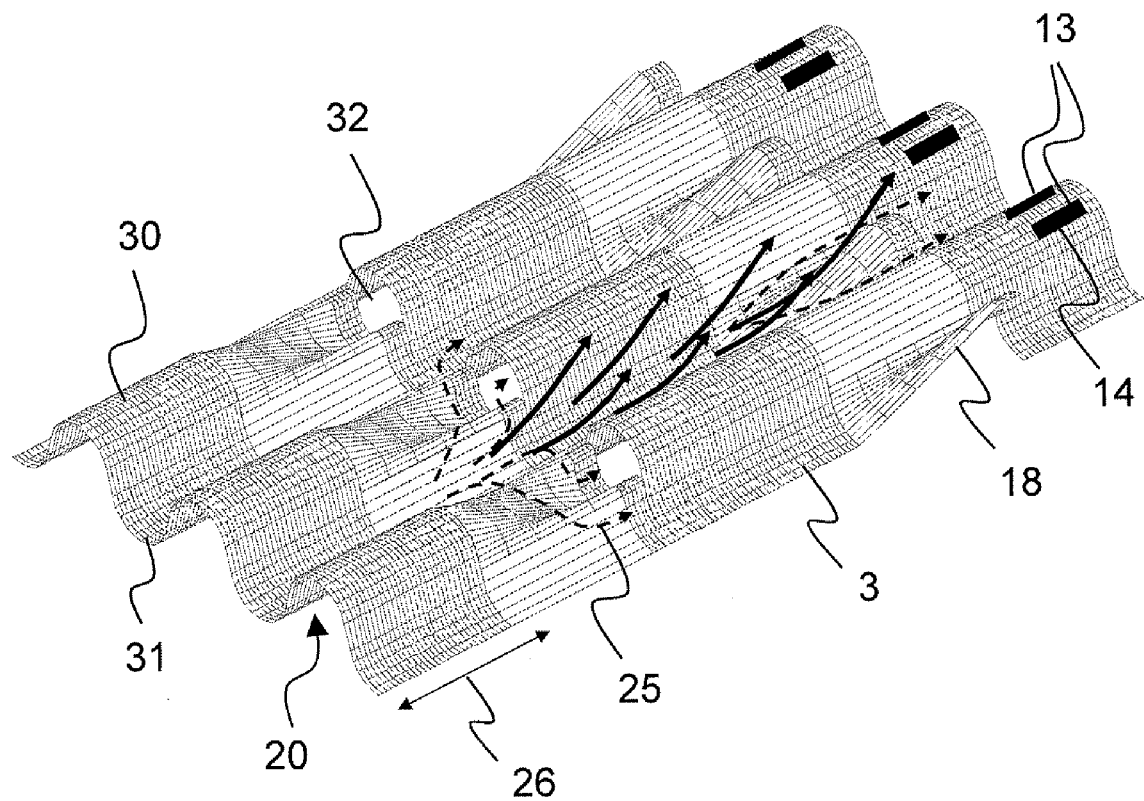
FIG. 11 is an enlarged, perspective view showing a possible embodiment of a structured metal foil for producing a honeycomb body.

FIG. 11 illustrates an embodiment variant of a corrugated metal foil 3, which can be alternately disposed with smooth metal foils, for example, as illustrated in FIG. 6. The corrugated metal foil 3 in this case has a structure 20 which forms the channels in the channel extension direction 26 through a periodic repetition of elevated portions, crests or peaks 30 and depressions, troughs or valleys 31. The corrugated metal foil also has fixtures or installations 18 which extend into the interior of the channels and therefore bring about deflection of partial exhaust streams. Openings 32 are provided adjacent these (punched-out) fixtures or installations 18. The exhaust gas can also flow through the openings 32, if appropriate, into adjacent channels, as indicated by corresponding arrows in the direction of flow 25. Mixing with flows to the left and right as well as up and down is also possible in this case.

Figure 12:
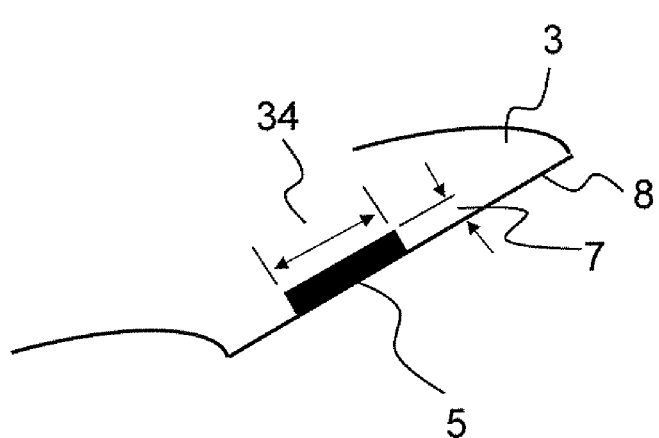
FIG. 12 is a fragmentary, elevational view showing a portion of a smooth metal foil with a linear brazed connection.

FIG. 12 shows an enlarged portion of a smooth metal foil 3, for example in a bent state for abutment against the inner lateral surface of a non-illustrated housing. This illustration is intended to (diagrammatically) show the linear brazed connection 5 which directly adjoins the edge 8 of the metal foil 3. In this context, the linear brazed connection 5 is embodied with a width 7 of, for example, 1 to 2 mm and a length 34 in a range of from 5 to 10 mm.

The invention claimed is:

1. A honeycomb body, comprising:
   a honeycomb body axis;
   at least one housing having an inner lateral surface;
   metal foils forming a channel structure having two end sides, said metal foils having edges bearing against said inner lateral surface of said housing at contact regions; and
   a multiplicity of linear brazed connections directly adjoining said edges of said metal foils and attaching said channel structure to said housing, said linear brazed connections having brazing material disposed only in said contact regions and parallel to said honeycomb body axis and at least one of said linear brazed connections spaced at a distance from both of said end sides of said channel structure.

2. The honeycomb body according to claim 1, wherein each of said linear brazed connections has a width of at most 5 millimeters in circumferential direction of said housing.

3. The honeycomb body according to claim 1, wherein a multiplicity of said metal foils each have at least one edge bearing against said housing and forming at least one of said linear brazed connections.

4. The honeycomb body according to claim 1, wherein no uninterrupted circumferential brazing region is provided in the circumferential direction of said housing.

5. The honeycomb body according to claim 1, which further comprises a circumferential brazing region with a multiplicity of said linear brazed connections in the circumferential direction of said housing, said linear brazed connections being spaced apart from one another and perpendicular to the circumferential direction.

6. The honeycomb body according to claim 1, wherein said housing has an inner lateral surface with a surface area covered by said channel structure, and at most 10% of said surface area has said linear brazed connections.

7. The honeycomb body according to claim 5, wherein at least one of said contact regions in said circumferential brazing region is free of said linear brazed connections.

8. The honeycomb body according to claim 5, wherein said circumferential brazing region defines an inner lateral surface, and said linear brazed connections form a surface area portion covering at most 10% of said inner lateral surface.

9. The honeycomb body according to claim 1, wherein said linear brazed connections have a length of 5 to 10 mm.

10. The honeycomb body according to claim 1, wherein said housing has brazed connections only on said inner lateral surface.

* * * * *